United States Patent [19]

Melber

[11] Patent Number: 4,902,722
[45] Date of Patent: Feb. 20, 1990

[54] EXPANDABLE GRAPHIC ART PRINTING MEDIA USING A SYNTACTIC FOAM BASED ON MIXTURE OF UNEXPANDED AND EXPANDED HOLLOW POLYMERIC MICROSPHERES

[75] Inventor: George E. Melber, Depew, N.Y.

[73] Assignee: Pierce & Stevens Corp., Buffalo, N.Y.

[21] Appl. No.: 204,304

[22] Filed: Jun. 9, 1988

Related U.S. Application Data

[60] Continuation of Ser. No. 122,693, Nov. 19, 1987, Pat. No. 4,771,079, which is a division of Ser. No. 756,270, Jul. 18, 1985, abandoned.

[51] Int. Cl.$^4$ .............................. C08J 9/22; C08J 9/32
[52] U.S. Cl. ...................................... 521/54; 427/222; 427/373; 428/408; 521/57; 521/58; 521/59; 521/134; 521/149
[58] Field of Search ................... 521/54, 134, 149, 59, 521/57

[56] References Cited

U.S. PATENT DOCUMENTS

| | | | |
|---|---|---|---|
| 4,006,273 | 2/1977 | Wolinski et al. | 521/134 |
| 4,044,176 | 8/1977 | Wolinski et al. | 521/145 |
| 4,771,079 | 9/1988 | Melber | 521/34 |

*Primary Examiner*—Morton Foelak
*Attorney, Agent, or Firm*—Waldron & Associates

[57] ABSTRACT

Syntactic foam graphic arts print media are provided which are particularly suitable for application to a substrate using high speed mechanical printing processes. The invention involves adding to a basic print medium a minor amount of pre-expanded, nonfriable, thermoplastic polyvinylidene chloride based microspheres substantially heat stable between about $-20°$ C. and $175°$ C., having a particle size to about 10 to 100 microns in diameter, to produce syntactic foams having unlimited shelflife stability. The print media thereby produced may be applied to any known substrate in any desired graphic pattern.

6 Claims, No Drawings

EXPANDABLE GRAPHIC ART PRINTING MEDIA USING A SYNTACTIC FOAM BASED ON MIXTURE OF UNEXPANDED AND EXPANDED HOLLOW POLYMERIC MICROSPHERES

This is a divisional of application Ser. No. 122,693, filed Nov. 19, 1987 now U.S. Pat. No. 4,771,079, which in turn is a division of Ser. No. 756,270 filed July 18, 1985, now abandoned.

BACKGROUND OF THE INVENTION

The present invention relates to the use of syntactic for printing. More particularly, this invention relates to syntactic foam compositions suitable for printing two and three-dimensional graphic designs and the like on various substrates including, but not limited to, paper and textile fabrics and to methods of using this foamed coomposition.

The formation of a permanent, good quality graphic representation or decorative pattern on a highly adsorbent and/or very irregular substrate surface such as coarse paper or textile fabrics has traditionally involved a multitude of problems due to the rough and uneven surface characteristics of such substrates. Numerous printing formulatoins have been developed over the years in an attempt to render such surfaces more receptive to print and recently, aerated foams have generated much interest. However, such foams are not readily suitable for use with modern, high speed printing equipment due to variations in foam density which render the foam highly unstable.

Accordingly, one of the primary goals of the textile printing industry is to develop improved, stable foams exhibiting excellent print quality, hand and fastness properties equivalent to conventional pigment print systems. In addition, such foams must be capable of withstanding the ever increasing line speeds characteristic of high speed printing operations and must have the proper rheological characteristics to withstand application on roller print as well as flat and rotary screen print machines at high speeds.

To accomplish this goal, precise formulations exhibiting certain specified properties must be developed. Among those factors to be considered are blow ratios, viscosity, bubble size and foam stability. Blow ratio is defined as the relationship obtained by dividing the weight of a given volume of an unfoamed system by the weight of the same volume of the resultant foamed system. The higher the blow ratio, the more air is present in the foamed composition. A decreasing blow ratio can produce off shading and color darkening. Even minor variations in blow ratio or density produce undesirable color variations in the print.

If the foam cell size increases beyond a certain point, a motley print may result. Preferred cell size is between 50 and 100 microns. Cells or bubbles, in this range produce creamy foams with good printing characteristics. Uniformity of bubble size is also important for foam stability. Foams containing air bubbles of nonuniform size require constant monitoring by a computer or other means in order to assure the maintenance of a constant viscosity.

Moreover, paper and textile printing and finishing operations are highly energy intensive with most of the energy consumed used to evaporate excess water present in the print medium. Since the most efficient energy conserving system would use air in foam form to replace water, extensive efforts are underway within the printing industry to produce better foamed formulations having greater stability which will further conserve energy and reduce production costs.

PRIOR ART

The use of organic microspheres as a lightweight filler in reinforced plastics is not new. In the late 1960's, the Dow Chemical Company introduced PVDC hollow plastic spheres, which they called Saran Microspheres, as a filler for making syntactic foams for many different applications. These included boats, sprayed-up bathroom fixtures, back-up of thermoformed acrylic sheets, cast synthetic wood, bowling ball cores, caulking and sealing compounds, high shear, low-density cores for sandwich panels, epoxy adhesives, polyurethane blown syntactic foams and expandable printing inks.

Applicants' assignee's prior issued patents, nos. 4,006,273 and 0,044,176 are directed to the production of expandable printing inks for use on paper and textile substrates by the incorporation of a minor amount of thermally expandable microspheres, into a cross-linkable polymer based printing medium, followed by the selective application of the ink to the substrate and the application of heat to the selectively coated substrate to expand the microspheres in the ink and cross-link the polymer binder. The expansion thus attained creates a raised or three-dimensional graphic effect which may be characterized as a continuous matrix of the cross-linked polymer medium employed, containing a dispersed phase of expanded microspheres. Where a foamed print medium is the carrier for the expandable microspheres, a raised foamed surface would be obtained by the selective application of heat.

SUMMARY OF THE INVENTION

It is accordingly a primary object of the present invention to provide syntactic foam compositions for printing graphic representations on any known substrate.

It is a further object of the present invention to provide syntactic foam compositions for use in the graphic arts for printing graphic representations on rough surfaced substrates which produces a final end product exhibiting better hand, mileage, abrasion resistance and holdout capability than presently available using conventional pigment printing media.

It is a further object of the present invention to provide syntactic foam compositions containing discrete, resilient hollow spheres of substantially uniform size which are heat stable at temperatures between about 0° C. and 175° C. and which exhibit excellent mechanical strength.

It is a further object of the present invention to provide syntactic foam compositions having unlimited shelf-life stability which are more economical and less energy intensive to produce.

It is still a further object of the present invention to provide syntactic foam compositions exhibiting superior printing characteristics which may be applied to substrates via high speed mechanical printing processes.

These objectives and other advantages may be achieved in accord with the present invention by incorporating into a graphic arts medium a minor amount of pre-expanded, nonfriable hollow microspheres, substantially heat stable between about −20° C. and 175° C., having a particle size of about 10 to 100 microns in diameter. The syntactic foams thereby produced possess unusually tough physical and mechanical properties, and may be applied to any known substrate in any desired pattern using any conventional method for forming or applying a graphic pattern to a substrate.

DETAILED DESCRIPTION OF THE INVENTION

The graphic media to which the present invention is applicable can be generally defined as any medium suitable for forming a graphic design containing pigments or dyes which can be characterized by the formation of a substantially continuous film from a solution when selectively applied to a substrate and in which the pre-expanded microspheres can be incorporated as a disperse phase thereby forming a syntactic foam. Such graphic media include, by way of example, paints, inks, dyes, lacquers, enamels, photographic emulsions and the like. Typically, such media would contain a pigment or the equivalent and a binder which is capable of forming a substantially continuous solid film upon the chosen substrate and would optionally include a wide variety of other materials, such as one or more of the following: diluents, opacifiers, fillers, extenders, leveling agents, flow promoters, plasticizers, dryers, cross-linking agents, thermal and/or ultraviolet light stabilizers, thixotropic agents, viscosity control agents, wetting agents, dispersing aids, gloss control agents and the like.

As employed herein, the term "pigment" is intended to be inclusive of that class of material which may be employed to impart color properties to a printing medium. As such, it is intended to include, not only literal pigments, but also dyes, lakes and like materials, and precursors thereof as well, as is the case in photographic procedures.

The solid film-forming binder will most often be a water borne natural or synthetic emulsion, dispersion or solution of a polymer material which, upon evaporation of the volatiles, results in the formation of a substantially continuous adherent film. While a thermosetting acrylic emulsion is preferred, the binder may also be a liquid or semi-solid polymer precursor, i.e. monomer or "prepolymer" which reacts in situ to provide the film-forming polymer. In such cases, polymerization catalysts may also be included. A solvent or thinner will be required or desired in such systems. The polymeric film-forming binder can be thermoplastic or thermosetting. Mixtures of polymers may be used as well as single materials.

Such graphic arts media are well known to those of ordinary skill in the art and are not per se a part of the present invention. It is accordingly not intended that the invention be construed as limited narrowly to specific media or to particular categories thereof. Nor should the invention be limited with regard to component ingredients of such media accept as herein defined.

The organic microspheres suitable for pre-expansion and for making the syntactic foams of the present invention are expandable, thermoplastic, hollow spheres composed preferably of polyvinylidene chloride co-reacted with other monomers to form a micron-sized external wall or shell of thermo-plastic synthetic resinous material encapsulating a generally centrally disposed volatile liquid blowing agent such as a low boiling hydrocarbon.

The process for the formation of such microspheres is a suspension polymerization technique known as limited coalescence which is described in U.S. Pat. Nos. 4,006,273 and 4,044,176 which are incorporated by reference herein. A typical preparation of such particles is as follows.

A polymerization reactor equipped with an agitator is charged with 100 parts by weight of deionized water and 15 parts by weight of a 30 weight percent colloidal silica dispersion in water. The colloidal silica dispersion is 30 weight percent solids and is available under the tradename of "Ludox HS". To this mixture is added 2.5 parts by weight of a 10 weight percent aqueous solution of a copolymer prepared from diethanol amine and adipic acid in equimolar proportions by carrying out a condensation reaction to give a product having a viscosity of about 100 centipoises at 25° C. One part by weight of a solution containing 2.5 weight percent potassium dichromate is added. The pH of the aqueous solution is adjusted to 4 with hydrochloric acid. Vinylidene chloride is utilized as the monomer. An oil phase mixture is prepared by utilizing 100 parts by weight of vinylidene chloride and 20 parts by weight neopentane (27.6 volume percent based on the total volume of the monomerneopentane mixture) and 0.1 part by weight of benzoyl peroxide as a catalyst. The oil phase mixture is added to the water phase with violent agitation supplied by a blade rotating at a speed of about 10,000 rpm. The reactor is immediately sealed and a portion sampled to determine the particle size. The droplets appear to have diameters of from 2 to about 10 microns. After the initial dispersion, the reaction mixtures are maintained at a temperature of about 80° C. for a period of 24 hours. At the end of this period, the temperature is lowered and the reaction mixture is found to have the appearance of a white, milky liquid similar to a chalk-white milk. A portion of the mixture is filtered to remove the particles and the particles or beads are subsequently dried for about 1 hour in the air oven at a temperature of about 30° C. Microscopic examination of the particles indicates particles having diameters of from about 2 to about 20 microns but which may be as small as about 0.5 microns and as large as about 200–300 microns in diameter and having disposed therein a distinct spherical zone which appears to contain liquid and a small vapor space.

Preferred polymers for preparation of the microspheres are for example, polyvinylidene chloride (PVDC), a copolymer of vinylidene chloride and acrylonitrile in weight ratios of about 100:1 to about 70:30, copolymers of acrylonitrile and methyl acrylate in weight ratios of from about 90:10 to 80:20, and copolymers of methacrylonitrile and methyl acrylate in weight ratios of about 93:7 to 82:18. The above materials and proportions are recommendations only and will vary depending upon the chemical properties of the polymers employed.

The most functional microspheres appear to be terpolymers based on PVDC having an unexpanded particle size in the 5 to 15 micron range and a density of approximately 1.17 grams per cubic centimeter. The combination of a near perfect spherical shape and compositional balance of the coreactants provides microspheres which can be custom tailored for a specific resin system. The thermoplastic of such microspheres can be generally any thermoplastic polymer but since the formation of a solution coating or printing composition is contemplated, the thermoplastic polymer of the microspheres should be different from the polymer present in the graphic media.

The preparation of the syntactic foams in accord with the present invention uses pre-expanded microspheres rather than expandable spheres. The pre-expansion of such expandable microspheres takes place when they are subjected to heat which softens the thermoplastic shell and simultaneously volatilizes the encapsulated hydrocarbon. The temperature at which the expansion takes place varies with the composition of the polymer shell. Typically, temperatures are in the 110° C. to 140° C. range.

The expansion process can be either wet or dry. In the wet process, a water slurry is introduced into a steam jet and subsequently quenched in cold water. Chilled air or nitrogen can also be used as the quench. The resulting ultra-low density microsphere product is 20% to 40% solids, pre-wet in water. Steam expanded microspheres are easily handled and are appropriate for use with water reducible phenolics, water extendable polyesters and water based inks such as textile pigment print media, where additional water can be tolerated.

For most syntactic foam applications in reinforced plastics and plastic composites dry expanded microspheres are required. The expansion of PVDC-based microspheres in the free state by hot air produces the lowest density filler currently available. Uniform ultra-low densities ranging from about 1.0 to 5.0 pounds per cubic foot are routine. A water slurry is used to introduce the unexpanded microspheres into a stream of hot dry air to expand them. In addition, the dried spherical particles may be heated in an air oven at a temperature of about 150° C. for at least 3 minutes.

Several methods for expanding the microspheres in accord with this invention are known in the art and are described in U.S. Pat. Nos. 4,397,799, 3,914,360 and 3,371,053 which are hereby incorporated by reference herein.

The size of the pre-expanded microspheres used to make the syntactic foams will be dependent upon the end use of the foam, the substrate to which the medium is to be applied and the overall surface characteristics of the substrate surface. In general, the spheres are of relatively small size, usually less than from about 100 to 200 microns in diameter and may be as small as from about 2 to 5 microns in diameter.

For most conventional substrates, micron diameters ranging from about 10 to 100 microns and more preferably from about 25 to 75 microns are usually satisfactory. However, if the substrate is an unusually porous paper or textile fabric, larger microspheres may be utilized.

In the present invention, the microspheres are incorporated into the printing medium in fully expanded form as a dispersed phase, i.e. a syntactic foam. The microspheres may be incorporated into the graphic medium at any convenient stage, that is, during the formulation of such media or at a later time to just prior to use. A wide variety of processing techniques can be employed to effect dispersion of the microspheres, which are readily wetted out in most media and, because of the extremely small dimensions of the particles, are readily mixed. In most contexts, a thorough uniform dispersion is desired, which is attained without difficulty by a simple mixing procedure. Unusual special effects may be attained by incomplete dispersion of the microspheres, and when such effects are desired, less than thorough mixing may be employed.

Ultra-low density dry microspheres require some unique handling and storage considerations. While the handling of the unexpanded microspheres poses no special handling or mixing requirements, the expanded microspheres must be considered almost as a vapor.

The expanded microspheres are easily pumped using a diaphragm pump to transfer them from shipping containers into a storage silo. Slight negative pressure in the silo would also be desirable. To move the microspheres from the storage into the mixer, a pneumatic system works best. The microspheres are taken up into the air stream and transferred to the mixer for filter separation.

To thoroughly incorporate the ultra-low density microspheres into a resin, a slow speed, folding type action is recommended. The density is so low (as compared to the resin) that the microspheres must be physically drawn down into the fluid to achieve a uniform dispersion.

In fully expanded form, these microspheres are found to have diameters of from about 2 to 5 times the diameter of the original unexpanded particles and to have a relatively thin, transparent wall and a gaseous center. Such microspheres, after pre-expansion, are highly resilient and heat stable at temperature ranges of from between about −20° C. to 175° C., and more preferably, between about 10° C. and 150° C. Thus, the expanded microspheres will not undergo any further deformation when utilized in pigments or dyes applied via high speed rotary screen printers wherein temperatures can reach approximately 140° C. Such resiliency and heat stability are critical when a foamed pigment print medium is being prepared as these qualities insure uniformity of sphere-bubble size throughout the foam making it extremely stable for an extended shelf-life. Microspheres made from friable substances such as glass or styrene beads would not be suitable for making such a syntactic foam print media, as such substances would crumble under the mechanical and physical stresses encountered during the printing process.

The foamed graphic media formulated in accordance with the present invention may be applied to a substrate by any of the known and conventional techniques appropriate thereto. Such techniques commonly include, for example, brushing, trowelling, spraying, pouring, dip-coating, printing, silk-screening, stenciling, electrostatic techniques and the like. All these techniques share in common the selective application of a graphic medium to a substrate, and all techniques are contemplated herein. Also contemplated are analogous techniques which involve a uniform application to a substrate, followed by the selective removal of portions of the medium. Such procedures are characteristic of photographic techniques, for example. Because of the finely divided nature of the microspheres, there is no impediment to any of the foregoing techniques attributable to the disperse phase.

The foamed compositions containing expanded microspheres in accord with the present invention are particularly well suited for use with conventional printing processes such as screen printing, offset lithography, gravure printing, letter press, flexography, thermography and others. The expanded microspheres are compatible with most known types of printing inks and other print media including pigmented foams used to print textiles via rotary screen.

The amount of expanded microspheres added to the print media may vary within broad ranges from about 0.10 weight percent to about 10 weight percent. In determining the number of spheres to be incorporated, factors such as the desired viscosity and color intensity of the final end product must be taken into consideration. Generally, viscosity will increase dramatically at a weight percent above 2 percent. Color intensity will weaken at a weight percent greater than 4 percent, permitting the formation of only pastel shades.

Most often, the desired effects may be obtained at a concentration of about 0.25 to 4 weight percent and preferably, at about 0.5 to 2 weight percent, although it should be noted that such concentrations are not ordinarily significant.

Depending upon the particular application technique to be employed, it may be desirable to dilute the system to adjust the viscosity of the medium to compensate for the addition of the microspheres. When the syntactic foam thus formed requires such adjustment, it may be cut or thinned in accord with conventional practices as for example, by reducing the amount of thickener present to arrive at the appropriate viscosity.

The substrates to which the syntactic foams may be applied in accordance with the present invention can be any with which the particular foam is compatible and to which such foam is adherent. Such substrates will commonly include various types and textures of paper, canvas, wood, plastics, metals, stone, plaster, fiberboard, fabrics, resinous foams, draperies, clothing, wall coverings, upholstery (particularly fabrics of such materials as cotton, rayon, rayon acetate, fiberglass, polyesters, polyacrylates, polyacrylonitrile, polyhydrocarbons and the like and including both woven and nonwoven fabrics), cements, asbestos, fiberglass, glass ceramics, and leather. Also contemplated is the application of the foam over or in combination with other diverse or similar media.

As stated previously, one of the goals of the foam printing industry is to produce a final printed substrate for example, a textile substrate which exhibits print quality comparable to that obtained using conventional pigment print media in terms of brightness of shade, hand (softness), holdout capability and reproducibility. Holdout refers to the ability of keeping the foamed formulation on the substrate surface rather than having it seep through and appear on the back of the substrate.

Table I below sets forth the formulation characteristics and physical properties of a typical syntactic foamed printing formulation containing 17 percent pigment as compared to those of a conventional pigment print paste having 10 percent pigment. On a weight per unit volume basis, the syntactic foam carries the same amount of pigment as the conventional pigment print medium.

TABLE I

|  | CONVENTIONAL PIGMENT PRINT | | SYNTACTIC FOAM PIGMENT PRINT | |
| --- | --- | --- | --- | --- |
|  | % | Lbs. (1-Gal) | % | Lbs. (1-Gal) |
| Water | 78 | 6.63 | 57.3 | 2.865 |
| Thickener | 2 | .17 | .8 | .040 |
| Binder | 10 | .85 | 22.4 | 1.120 |
| Microspheres |  |  | 2.5 | .125 |
| Pigment | 10 | .85 | 17.0 | .85 |
| TOTAL | 100 | 8.50 | 100 | 5.00 |
| Lbs. Non-Volatile |  |  | 1.292 | 1.557 |
| Lbs. Water |  |  | 7.208 | 3.443 |
| % Non-Volatile (Weight) |  |  | 15.2% | 31.1% |
| % Non-Volatile (Volume) |  |  | 13.5% | 58.7% |

As shown by the data set forht in Table I, incorporation of the expanded microspheres into the conventional pigment print eliminates over one half the water and raises the nonvolatiles by volume from 13.5% to 58.7%. In addition, the syntactic foam formulation due to the presence of the pre-expanded microspheres has an unlimited shelf-life stability in contrast to conventional aerated foams which exhibit virtually none.

It is also within the scope of the present invention to substitute a minor amount of pre-expanded microspheres for a portion of the expandable microspheres present within foamable formulations used to produce a raised or three dimensional graphic effect on paper or textile substrates. One such formulation is commercially available under the name FOAMCOAT. The partial substitution of pre-expanded spheres renders such formulations more economical to produce. One of the potential benefits exhibited by such a system is the ability to print, dry, expand and cure the foam on a rotary screen press at increased line speeds.

The ratio of pre-expanded microspheres to expandable microspheres may, of course, vary within wide limits depending upon end use, method of applicaiton, etc. However, with a combination of 1 percent pre-expanded with 16 percent expandable microspheres, the mileage obtained is substantially better than that obtained with FOAMCOAT not enhanced with pre-expanded spheres. In general, it is anticipated that the range of pre-expanded spheres to be added to the FOAMCOAT should be in the range of about 0.1 percent up to about 5 percent. When 1 percent of the expandable beads are replaced by 1 percent pre-expanded microspheres, the solids by volume is increased from 42.8 percent up to about 60 percent which allows for faster running speeds by virtue of the increased solids content.

In addition, since the pre-expanded spheres plug oversized voids present in poor quality papers and other porous substrates, the foamable print medium not only goes farther, but exhibits better holdout properties. Since the pre-expanded microspheres are incorporated within the foamable print medium, the microspheres are deposited only in those areas actually receiving the graphic medium. This obviates the need for any separate groundcoating formulation thereby greatly reducing the amount of materials applied to the substrate which is extremely advantageous from an economic standpoint.

The properties of the resulting foam print medium can be tailored to the intended use on the basis of the chemical and physical properties of the components included in the base formulation with emphasis upon the microspheres and their physical and chemical characteristics. In the compositions generally contemplated in the present invention, the developed medium will comprise a continuous phase matrix of the base medium and a disperse phase of the expanded and pre-expanded microspheres. Since the microspheres are not contiguous, the medium has a great degree of integrity determined by the cohesiveness of the continuous phase.

While many variations of the present invention are contemplated, the considerable simplicity of the invention and its fundamental concepts enable those of ordinary skill in the graphic arts to implement the practice of the invention with a minimum of specific guidance once the basic nature of the invention is clearly understood. However, the following specific examples are included to illustrate a few of the numerous facets of graphic technology which can advantageously employ the method of the present invention. These examples are intended to be ilustrative only and are not intended to be limiting upon the scope of the invention.

EXAMPLE I

A syntactic foamed printing formulation was prepared for silk-screening by mixing the following components in the indicated proportions by weight:

| Component | Parts by Weight |
| --- | --- |
| Thermosetting Acrylic Latex Binder | 27 |
| Thickener | 1 |
| Pre-Expanded Microspheres | 3 |
| Water (deionized) | 69 |

Each of the above component ingredients was as follows:

The thermosetting acrylic latex was RohM & Hass RHOPLEX TR 520.

The thickener was Polymer Industries Print Concentrate 430M.

The pre-expanded microsphers were Pierce and Stevens MIRALITE 177 which are terpolymers based on polyvinylidene chloride having a particle size in the 20 to 100 micron range and a density of about 0.036 grams per cubic centimeter.

This formulation was thereafter divided and a variety of colorants were added at 5%, 10%, and 20%.

Each sample was silkscreened through a 120 mesh screen using conventional printing techniques without auxiliary foam generating equipment, onto cotton, polyester and cotton-polyester blend (containing 20 percent cotton) substrates. In each case, the printed end product exhibited better hand and holdout than previously obtained with conventional textile pigment printing media.

EXAMPLE II

Approximately 1 percent of the unexpanded microspheres contained in a foamable polymer composition used for decorative printing which is available commercially as FOAMCOAT (Pierce & Stevens Chemical Corporation, Buffalo, N.Y.) was replaced by dry, pre-expanded microspheres sold under the trademark MIRALITE 177 also available from Pierce & Stevens.

A comparison of the physical characteristics of the regular FOAMCOAT formulation and the FOAMCOAT enhanced by the addition of the pre-expanded microspheres is as follows:

| | FOAM-COAT | FOAMCOAT PLUS PRE-EXPANDED MICROSPHERES |
| --- | --- | --- |
| Solids | 53.0% | 49.5% |
| Viscosity | 17,500 cps. | 17,500 cps. |
| Weight per Gallon | 9.00 lbs. | 6.60 lbs. |
| PER GALLON: | | |
| Water | 4.23 lbs. | 3.33 lbs. |
| Vehicle | 3.77 lbs. | 2.51 lbs. |
| Unexp. Microspheres | 1.00 lbs. | 0.60 lbs. |
| Pre-Expanded Microspheres | 0 | .066 lbs. |
| NON-VOLATILE: | | |
| By Weight | 53.0% | 49.5% |
| By Volume | 42.8% | 60.0% |

As may be seen from the above, the substitution of 1 percent dry pre-expanded microspheres into regular FOAMCOAT reduced by about one third the amount of unexpanded microspheres required per gallon, as well as about one third of the vehicle while at the same time eliminating more than 20 percent of the water carried in the same unit volume. The data demonstrates a net increase in the nonvolatile by volume from 42.8 percent up to 60 percent in the enhanced FOAMCOAT. The net overall result is a much more economically efficient utilization of a reduced amount of microspheres.

EXAMPLE III

The enhanced FOAMCOAT formulaton described in Example II was used to print 17,000 yards of fabric on a STORK RD-III rotary screen printing machine using an 80 mesh screen. The fabric was a cotton-polyester blend having a ratio of 50 percent cotton to 50 percent polyester.

A comparison of the final printed substrates with substrates printed using regular FOAMCOAT found them to be equally suitable for rotary screen printing and virtually no difference was observed between the quality of the printing characteristics obtained as compared with regular FOAMCOAT. The enhanced FOAMCOAT exhibited exceptional hold-out properties even when applied to relatively open weaved fabrics. Subsequent finishing and testing of the printed substrate showed no differences in the ultimate end use of the printed materials.

EXAMPLE IV

The enhanced FOAMCOAT formulation described in Example III was used to print 3500 yards of fabric on a STORK RD-III rotary screen printing machine using an 80 mesh screen. The fabric was a cotton-polyester blend having a ratio of 20 percent cotton to 80 percent polyester.

Again virtually no difference was observed between the printing properties exhibited by the enhanced FOAMCOAT as compared with regular FOAMCOAT, except that improved hold-out capability was obtained using the enhanced formulation. This improved hold-out was demonstrated by a comparison of photographs of the backsides of fabric printed with regular FOAMCOAT and enhanced FOAMCOAT showing far less "strike through" on the back of the fabric printed using the enhanced print medium.

While the pre-expanded resilient microspheres described herein are particularly well suited for the production of syntactic, foamed and foamable printing media, it is also within the scope of the instant invention to use such microspheres to improve the mileage and holdout properties of conventional pigment printing media. Pigment printing on textiles and other porous substrates suffers from all of the problems associated with producing a good quality foamed print on a highly absorbent, very irregular surface. In the past, attempts have been made to overcome these problems by applying a ground coating composition over the entire surface of the substrate prior to printing.

The use of such overall ground coats for textile substrates is not feasible. However, the incorporation of pre-expanded microspheres in the pigment print vehicle will allow the printer to produce a ground coat surface on the textile substrate at the time it is printed and only in the areas being imprinted by using the print vehicle itself as a carrier for the microspheres. In this way, the coated surface for printing would be formed at the same time that the pigment print is being put down. The function of the pre-expanded microsphere in pigment printing would not create a raised dimensional print, but would act as an efficient hold-out additive to enhance the pigment print as an in situ ground coat. Set forth below is a typical print paste for pigment printing currently used by the industry, and a proposed formulation incorporating pre-expanded microspheres.

TABLE II

|  | TYPICAL PIGMENT PRINT PASTE % | MICROSPHERE PRINT PASTE % (Theoretical replacing ½ volume of water) |
| --- | --- | --- |
| Water | 68.0–83.4 | 95.0 |
| Thickener (e.g., Carbopol) | 1.6–3.0 | .50 |
| Acrylic Binder (e.g. Rohm & Hass TR 520) | 10–12 | 18.6 |
| MIRALITE 177 (microspheres) |  | 3.3 |
| Melamine | 0–1 | 0 |
| Lubricant | 0–1 | 0 |
| Color | 5–15 | 18.6 |
|  | 100.0 | 100.0 |

The amount of pre-expanded microspheres added to a given pigment print paste formulation will depend upon the pigment used, the intended end use and the final viscosity desired for the printing process employed. In general the amount of pre-expanded spheres may vary broadly to form about 0.10 weight percent to about 10 weight percent. The enhanced pigment print formulation after adjustment to the proper viscosity may be used for a wide variety of printing operations including gravure press and flexographic print processes. However, with each printing process it may be necessary to accommodate for the size of the microspheres by the selection of an appropriately etched cylinder.

It is to be fully understood that all of the foregoing Examples are intended to be merely illustrative and are not to be construed or interpreted as being restrictive or otherwise limiting of the present invention, excepting as set forth and defined in the hereto appended claims.

What is claimed is:

1. In a thermally expandable syntactic foam graphics art medium containing a polymer binder, a vehicle, and hollow, thermaly expandable thermoplastic microspheres, the improvement comprising:

including in said ink composition about 0.1 to about 10 weight percent, based on the weight of the non-volatile contents of said medium, of expanded hollow, thermoplastic microspheres, said expanded microspheres having a diameter of from about 2 to about 5 times the diameter of the said expandable microspheres, said diameter being in the range of from about 10 to 200 micrometers having a density of from about 1 to about 5 lbs per cubic foot, and said expanded microspheres are substantially free from further expansion at the temperature of thermal expansion of said medium.

2. The graphics art medium of claim 1 wherein said medium is an aqueous dispersion.

3. The graphics art medium of claim 1 wherein said medium is a plastisol.

4. The grpahics art medium of claim 1 wherein said binder is a cross-linkable polymer which is cross-linked at the temperature of thermal expansion of said medium.

5. The graphics art medium of claim 1 wherein said vehicle is a solvent for said binder, and said microspheres are insoluble in said vehicle.

6. The graphics art medium of claim 1 wherein said vehicle is a solven for said binder, and said microspheres are rendered insoluble in said vehicle by a coating applied to the surface thereof.

* * * * *